United States Patent [19]
Jerg et al.

[11] Patent Number: 5,829,085
[45] Date of Patent: Nov. 3, 1998

[54] APPARATUS AND METHOD FOR REPEATED, AUTOMATIC METERING OF PRECISELY METERED QUANTITIES OF A POWDERED DETERGENT INTO WATER-CARRYING CLEANING MACHINES, IN PARTICULAR HOUSEHOLD AND HOUSEHOLD WASHING MACHINES

[75] Inventors: Helmut Jerg, Giengen, Germany; Daniele Cerruti, Caresana-Vc, Italy

[73] Assignee: Bosch-Siemens Hausgeraete GmbH, Munich, Germany

[21] Appl. No.: 887,469

[22] Filed: Jul. 2, 1997

Related U.S. Application Data

[62] Division of Ser. No. 580,435, Dec. 27, 1995, Pat. No. 5,694,794.

[30] Foreign Application Priority Data

Dec. 27, 1994 [DE] Germany .................... 44 46 882.2

[51] Int. Cl.$^6$ .................... D06F 39/02; A47L 15/44
[52] U.S. Cl. .................... 8/158
[58] Field of Search .................... 68/17 R; 134/93, 134/104.1; 222/148, 363, 368, 636; 8/158

[56] References Cited

U.S. PATENT DOCUMENTS

| | | | |
|---|---|---|---|
| 2,636,503 | 4/1953 | Hilliker | 134/93 |
| 2,793,940 | 5/1957 | Bennett | 68/17 R X |
| 2,816,427 | 12/1957 | Vela | 68/17 R |
| 3,188,146 | 6/1965 | Cordes | 68/17 R X |
| 3,204,833 | 9/1965 | Weitzner | 222/268 X |
| 3,212,675 | 10/1965 | Krzewina | 134/93 X |
| 3,233,782 | 2/1966 | Ullman, Jr. et al. | |
| 4,528,848 | 7/1985 | Haefner | |
| 5,209,607 | 5/1993 | Wei et al. | 222/636 X |
| 5,310,090 | 5/1994 | Taylor, Jr. | 134/93 X |
| 5,413,259 | 5/1995 | Cerruti et al. | 222/636 |

FOREIGN PATENT DOCUMENTS

| | | |
|---|---|---|
| 0 297 371 | 1/1989 | European Pat. Off. . |
| 1 585 592 | 4/1971 | Germany . |
| 37 30 405 | 3/1988 | Germany . |
| 41 34 786 | 7/1992 | Germany . |
| 446630 | 3/1968 | Switzerland . |
| 1 790 651 | 5/1972 | U.S.S.R. . |
| 1 149 574 | 4/1969 | United Kingdom . |
| 1 204 422 | 9/1970 | United Kingdom . |
| 82/00482 | 2/1982 | WIPO . |
| 93/18701 | 9/1993 | WIPO . |

*Primary Examiner*—Philip R. Coe
*Attorney, Agent, or Firm*—Herbert L. Lerner; Laurence A. Greenberg

[57] ABSTRACT

An apparatus and a method for repeated, automatic metering of precisely metered quantities of a powdered detergent into water-carrying cleaning machines, in particular household dishwashers and household washing machines, include a detergent holder and a metering and dispensing device having a movable metering device with at least one metering receptacle. The interior of the detergent holder and a guide of the metering and dispensing device are acted upon continuously by a stream of compressed air. Therefore, clumping of the highly hygroscopic powdered detergent and an expensive, complex apparatus, which requires a high drive torque and a high air pressure, are avoided. The metering device has only one metering receptacle. The metering and dispensing device has two chambers communicating with one another. The detergent fed into the first chamber is fed gradually, during the motion of the metering device, into the second chamber, which has an opening toward the treatment vessel. The treatment vessel-side opening of the second chamber is closed by a lid connected to the metering device. The lid, in the dispensing position of the metering and dispensing device, uncovers a discharge opening, from which the metered detergent is fed gradually to the treatment vessel. Sealing elements which surround the treatment vessel-side opening of the second chamber are provided, which cooperate with the lid.

1 Claim, 7 Drawing Sheets

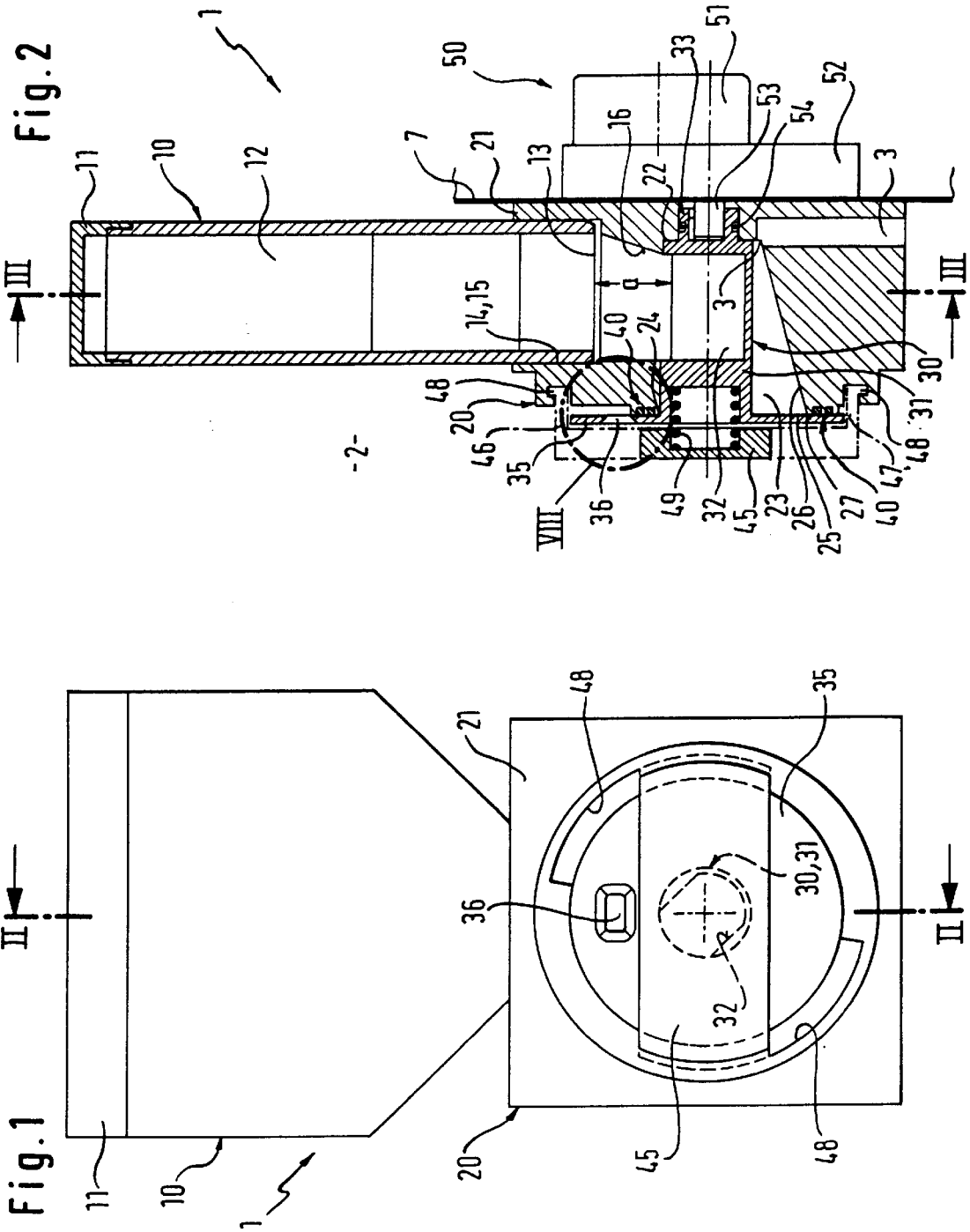

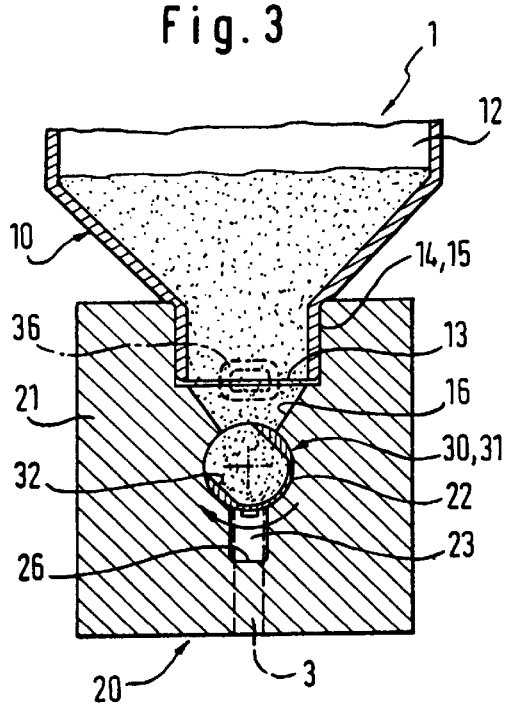
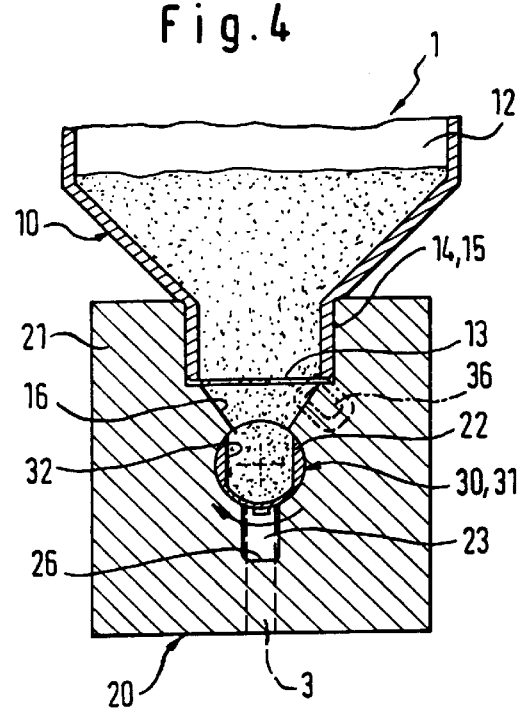
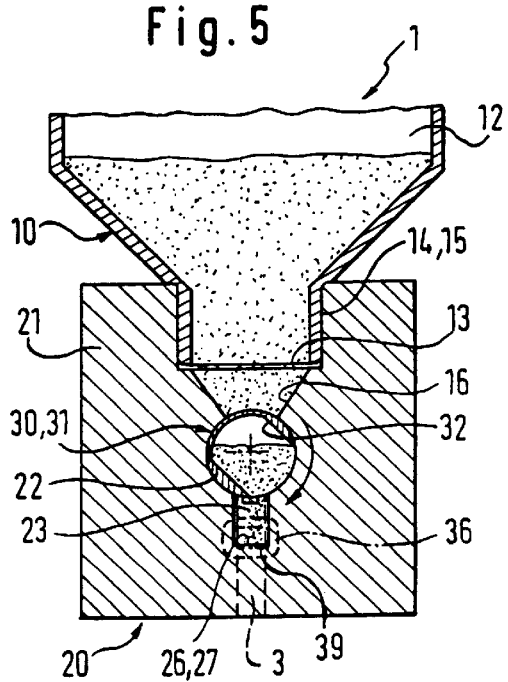
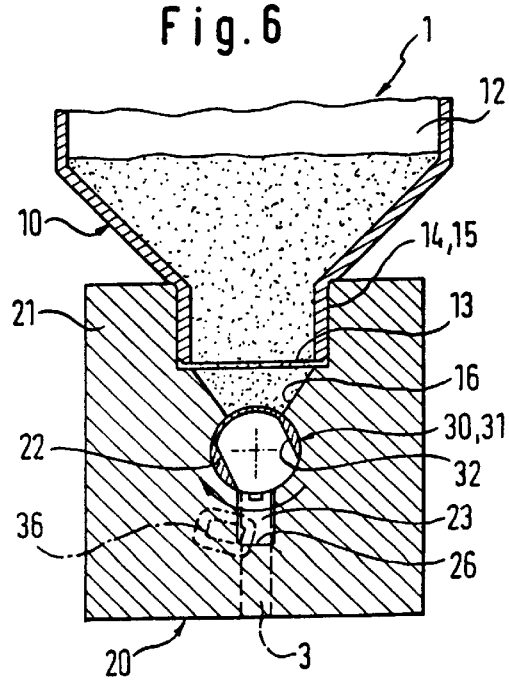

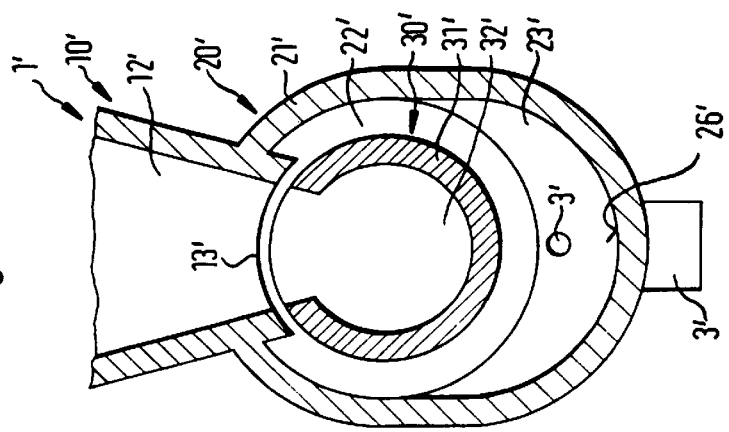
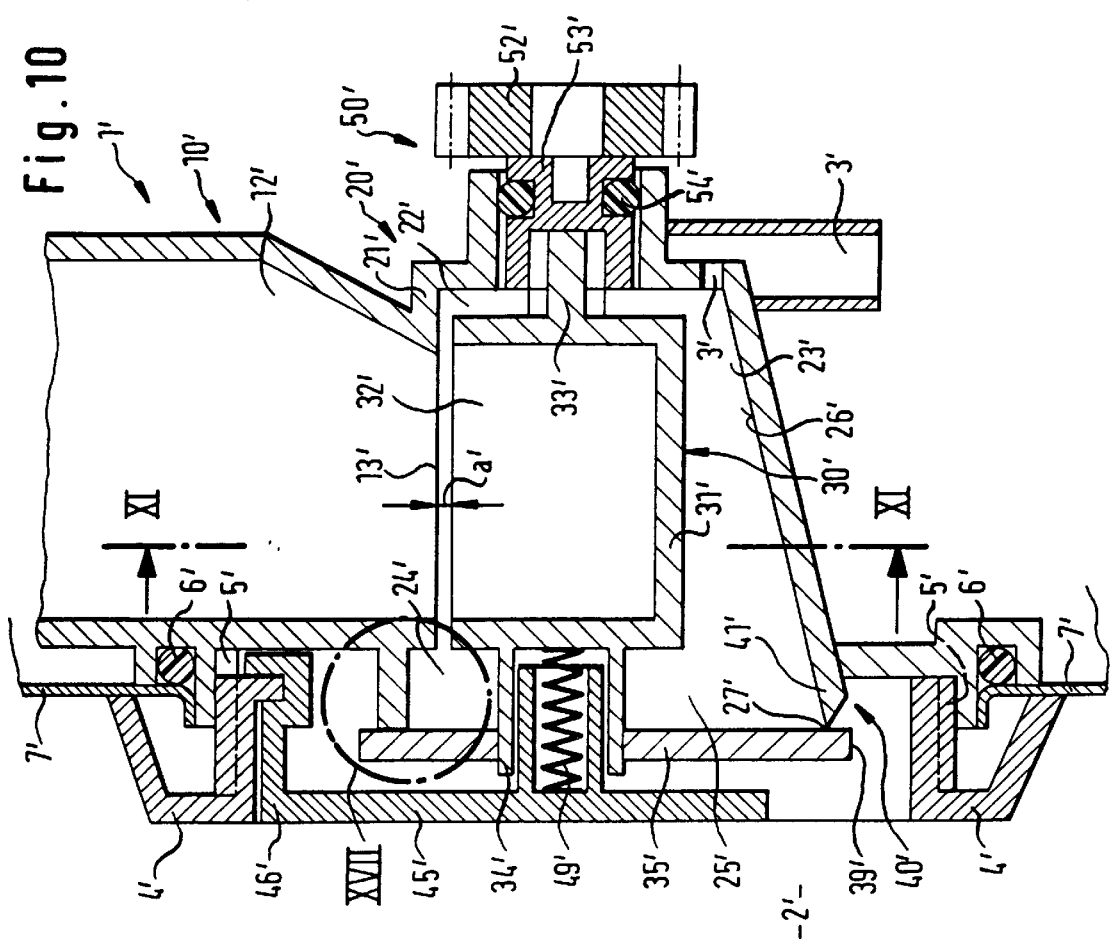

5,829,085

APPARATUS AND METHOD FOR REPEATED, AUTOMATIC METERING OF PRECISELY METERED QUANTITIES OF A POWDERED DETERGENT INTO WATER-CARRYING CLEANING MACHINES, IN PARTICULAR HOUSEHOLD AND HOUSEHOLD WASHING MACHINES

This is a division of application Ser. No. 08/580,435 filed on Dec. 27, 1995, and now U.S. Pat. No. 5,694,794.

BACKGROUND OF THE INVENTION

1. Field of the Invention

The invention relates to an apparatus and a method for repeated, automatic metering of precisely metered quantities of a powdered detergent into water-carrying cleaning machines, in particular household dishwashers and household washing machines, including a detergent holder and a metering and dispensing device.

There are machines on the market in which the supply of metered quantities of a detergent takes place automatically and repeatedly for each cleaning cycle; the goal is optical cleaning action with simultaneous reduction in the consumption of energy and in environmental pollution, as well as the avoidance of mistakes in metering the detergent.

In the known machines, those demands are intended to be met by using large-capacity metering devices with a metering and dispensing device, which are suitable for automatic, repeated dispensing of exact, predetermined quantities of detergent for each cleaning cycle. Those devices are aimed at a treatment chamber of the cleaning machines referred to at the outset and typically have a rotating part, which has a plurality of metering chambers, into which the detergent is poured from an outlet opening of the detergent holder and is pumped to a fixed discharge opening, from which the detergent is then expelled into the interior of the treatment chamber of the cleaning machine. In some known devices, the expulsion of metered detergent takes place by the weight of the detergent itself. In other known devices, the metered detergent is expelled through the use of a flow of water.

However, those known configurations for automatic, repeated delivery of accurately metered quantities of detergent require complex devices which can only be manufactured industrially at major effort and expense. It has been found in practice that those devices do not always function reliably, since the highly hygroscopic powdered detergent often clumps together as a result of the moisture entering from the treatment vessel of the cleaning machine into the detergent holder and/or the metering and dispensing device through the necessarily present discharge opening. As a result, the function is impeded, and moreover the lumps are difficult to remove from the detergent holder of the metering device. Clumping of the powdered detergent represents such a major disadvantage that in the worst case, from swelling of the volume of the detergent fed into a metering chamber, complete blockage of the metering device can occur. Moreover, powdered detergents have a pronounced scouring action, and the escape of detergents into guides, bearings and so forth of the metering device. That disadvantage can be effectively overcome only by using complicated and expensive seals.

In U.S. Pat. No. 3,188,146, it is proposed, in order to overcome the above disadvantages, that the detergent holder and the metering and dispensing device be acted upon with compressed air in the dispensing position of the apparatus. That known apparatus is very complex, and because of its enormously large structural size it cannot be accommodated in modern household dishwashers or household washing machines. Moreover, the known apparatus has numerous openings and conduits for the detergent, which can easily become plugged by the detergent and can thus cause disruptions of the known apparatus, up to the point of complete inability to function.

In order to avoid those disadvantages, Published International Patent Application WO 93/18702 has disclosed an apparatus of the type referred to at the outset, in which the detergent holder and the apparatus are acted upon continuously by compressed air; the air pressure of the compressed air in the apparatus is higher than the air pressure prevailing in the treatment vessel of the water-carrying cleaning machine, so that it has been possible to reduce the danger of the entry of moisture into the apparatus and to improve the expulsion of the metered detergent. The aforementioned apparatus has a movable protective flap for the detergent outlet opening. It has now been found in practice that that protective flap, because of its rotary motion, entrains traces of moisture to the outlet opening, which despite the constant outflow of compressed air still leads to clumping of detergent in the outlet opening and in the metering receptacles and thus causes functional disruptions up to the point of inability of the apparatus to function. Moreover, the flap in motion and its seal entrains particles of detergent, which exert a pronounced scouring action and which damage the seal and the sealing face. The apparatus according to Published International Patent Application WO 93/18702 has a metering device with a plurality of metering receptacles; the outlet opening is disposed in the upper region of the housing, so that the uppermost metering receptacle can be emptied. As a result, fine to superfine particles of detergent enter the lower portion of the chamber receiving the metering device, which as has been found in practice leads to such pronounced friction at the metering device that disruptions in function up to the point of inability of the apparatus to function can occur. In order to overcome the friction, a very high torque must be imposed for driving the metering device. A further disadvantage has proved in practice to be that the discharging of a total metered single quantity of detergent necessitates a pronounced air flow, or in other words a high pressure of the compressed air acting upon the apparatus. Moreover, the complexity and the number of parts, especially large-volume parts that are in motion, is a disadvantage in the apparatus of Published International Patent Application WO 93/18702, because that makes for high costs of the apparatus in terms of manufacture and installation, and as already noted above, a high torque is needed to drive the large parts in motion.

SUMMARY OF THE INVENTION

It is accordingly an object of the invention to provide an apparatus for repeated, automatic metering of precisely metered quantities of a powdered detergent into water-carrying cleaning machines, in particular household dishwashers and household washing machines, which overcomes the hereinafore-mentioned disadvantages of the heretofore-known methods and devices of this general type in a simple way and creates a method for advantageous operation of the apparatus of the invention.

With the foregoing and other objects in view there is provided, in accordance with the invention, an apparatus for repeated, automatic metering of precisely metered quantities of a powdered detergent into water-carrying cleaning machines, in particular household dishwashers and household washing machines, comprising a detergent holder with an outlet opening above a metering and dispensing device having at least one loading and one dispensing position, being equipped with a movable metering device having at least one metering receptacle for receiving a single metered quantity of the powdered detergent, the detergent being fed into a treatment vessel of the water-carrying cleaning machine, an interior of the detergent holder and a guide of the metering and dispensing device being acted upon continuously by a stream of compressed air, and the stream of compressed air in the dispensing position also acting upon the interior of the metering receptacle, the metering device having only one metering receptacle for receiving a single metered quantity of the powdered detergent; the metering and dispensing device having two chambers communicating with one another, including a first chamber communicating with the detergent holder being disposed below the outlet opening of the detergent holder, and the detergent fed into the first chamber being fed gradually, during the motion of the metering device, into a second chamber, having an opening toward the treatment vessel; the treatment vessel-side opening of the second chamber being closed, in the loading position, by a lid connected to the metering device, the lid, in the dispensing position, uncovering a discharge opening, from which the metered detergent is fed gradually to the treatment vessel; and sealing elements surrounding the treatment vessel-side opening of the second chamber and cooperating with the lid being disposed on a housing of the metering and dispensing device.

Since the metering device has only one metering receptacle, only a small part has to be put into motion, and so the drive of the apparatus of the invention can be operated with substantially lower torque than in the prior art described above. Moreover, the apparatus of the invention thus becomes substantially less complex than in the prior art described, and is thus more economical to manufacture and install. Since the metering receptacle of the metering device evacuates the detergent into a second chamber which communicates with the first chamber, the deposit of detergent particles, which might rub against or scour the metering device, is effectively avoided in a simple way, which once again enables a substantial reduction in the required driving torque and effectively prevents problems in the function of the apparatus of the invention. Since the lid is connected to the metering device and thus is moved along with it, a further reduction in complexity of the apparatus of the invention is attained. As a result of the gradual discharge of detergent to the metering device, from there to the second chamber, and from there into the treatment vessel of the water-carrying cleaning machine, a still further reduction in the requisite driving torque for the apparatus of the invention is attained. It is also extraordinarily advantageous that particularly because of the gradual discharge of the accurately metered quantity of detergent, the air flow used for the discharge needs to be only substantially less strong in the apparatus according to the invention; that is, the compressed air flowing within the apparatus of the invention requires only a substantially lower pressure, and so compared with the above-described prior art, a substantially smaller compressed air generator, such as a pump used in aquariums, can be used and nevertheless an invasion of moisture into the apparatus of the invention is effectively prevented, and the detergent is reliably expelled from the apparatus of the invention. Due to the disposition of sealing elements between the lid that moves with the metering device and the housing of the apparatus of the invention that surrounds the treatment-side opening of the chamber, seals on moving parts, which could be damaged by scouring by entrained detergent particles, are avoided in a simple way. Moreover, an invasion of moisture into the apparatus according to the invention is effectively prevented with the sealing elements.

In accordance with another feature of the invention, the lid is acted upon by streams of a cleaning fluid which are generated in the treatment vessel. Thus, entrained detergent particles which might stick to the lid are floated away, so that damage to the seals or the sealing face is avoided even better, and self-cleaning of the apparatus of the invention is attained.

In accordance with a further feature of the invention, the movable metering device is constructed essentially cylindrically and is disposed in the first chamber. With this provision, a further reduction in size of the only part in motion of the apparatus of the invention is attained, which in turn serves to lower the driving torque and the complexity of the apparatus of the invention.

In accordance with an added feature of the invention, the metering device is rotatably supported in the housing of the metering and dispensing device and is disposed at a distance from the end of the outlet opening, of the detergent holder associated with the first chamber. By the definition of a simple rotary motion of the metering device, a further reduction in the complexity in the apparatus of the invention is attained. By disposing the metering device at a distance from the outlet opening of the detergent holder, additional friction between the metering device and the detergent holder is avoided. Any detergent which might settle out in very slight quantities reaches the second chamber and is expelled in the dispensing position of the metering and dispensing device.

In accordance with an additional feature of the invention, the metering device is rotatably supported by a coupling bolt in the housing of the metering and dispensing device, so that in a simple way, the possibility of coupling to a drive is combined with the necessity of the bearing.

In accordance with yet another feature of the invention, the discharge of the accurately metered quantity of detergent from the apparatus according to the invention is made even easier, by providing that the second chamber is disposed substantially below the first chamber and has a lower surface that drops downward toward the treatment vessel-side opening.

In accordance with yet a further feature of the invention, the volume of the second chamber is smaller than the volume of the metering receptacle.

In accordance with yet an added feature of the invention, a simplification in the manufacture of the apparatus of the invention is attained in a simple way, by providing that both chambers have treatment vessel-side openings, which are closed by the lid in the loading position of the apparatus according to the invention, and that sealing elements that surround the treatment vessel-side openings of both chambers and which cooperate with the lid are disposed on a housing of the metering and dispensing device. Since the sealing elements encompass both openings, the expense of separate sealing elements is avoided.

In accordance with yet an additional feature of the invention, simple manufacture and therefore a reduction in cost for the apparatus of the invention is attained, by providing that the lid is constructed as a disklike, substantially circular element.

In accordance with again another feature of the invention, the lid is formed onto the metering device, which makes the manufacture and installation of the apparatus of the invention even easier and more favorable.

In accordance with again a further feature of the invention, in the lid, the discharge opening is disposed in the form of an aperture, having side walls which are beveled or frustoconical and constructed with a sharp-edged profile. The simple manufacture of an aperture means that manufacture and installation of the apparatus of the invention become even easier and more favorable. The special shape of the aperture in accordance with the further preferred embodiment of the invention improves the discharge of detergent from—the apparatus of the invention. The sharp-edged periphery of the aperture with the sharp-edged profile provides a simple way of preventing entrainment of detergent particles.

In accordance with again an added feature of the invention, the discharge opening leads ahead of the metering receptacle, in the direction of motion of the metering device, in such a way that in the motion toward the metering position of the metering and dispensing device, the discharge opening at least partially uncovers the treatment vessel-side opening of the second chamber even before the gradual feeding of the detergent from the metering receptacle to the second chamber begins. It is thus assured that even the first detergent particles that are transferred from the metering receptacle can immediately be expelled from the apparatus of the invention, so that the pressure of the air flow can be kept low. By this provision it is also attained that already quite early after the uncovering of the discharge opening, approximately after half the length of the entire period of time within which the discharge opening is in communication with the second chamber, the entire metered quantity of detergent is expelled, so that it can be assured that even the slightest residues of detergent will be blown out of the second chamber by the airflow.

In accordance with again an additional feature of the invention, the discharging of the accurately metered quantity of detergent from the apparatus of the invention is made even easier by providing that a lower edge of the discharge opening, in the metering position of the metering and dispensing device, is located somewhat lower than a lowermost edge of the treatment vessel-side opening of the second chamber. As a result, the expelled detergent does not come into contact with the possibly damp side walls of the discharge-opening, so that adhesion and clumping of the detergent in the discharge opening is effectively prevented.

In accordance with still another feature of the invention, the lid is permanently connected to a bearing bolt of the metering device, which means that production and installation of the apparatus of the invention become even easier and more favorable.

In accordance with still a further feature of the invention, the lid is eccentrically disposed on the bearing bolt in such a way that in the motion of the metering device toward the metering position of the metering and dispensing device, the uncovering of the discharge opening, or in other words the uncovering of the treatment vessel-side opening of the second chamber, begins even before the gradual feeding of the detergent from the metering device begins. With this advantageous feature of the invention, the making of an aperture for the discharge openings can be avoided in a simple way, which once again makes production and installation of the apparatus of the invention easier and more favorable.

In accordance with still an added feature of the invention, an especially effective prevention of the entrainment of detergent particles and traces of moisture by the lid in motion is achieved by providing that the sealing elements include at least one sharp-edged sealing edge that protrudes toward the lid. Simple manufacture and therefore a cost reduction for the apparatus of the invention is attained, in an advantageous feature of the invention, in that the sealing edges are formed on in the peripheral regions of the treatment vessel—side openings of the two chambers.

In accordance with still an additional feature of the invention, a further improvement in the effective prevention of the entrainment of detergent particles and traces of moisture by the lid in motion is attained by providing that the sealing elements include at least one seal.

In accordance with another feature of the invention, a further improvement in the effective prevention of the entrainment of detergent particles and traces of moisture by the lid in motion is attained by providing that the sealing elements include at least two concentrically disposed sealing edges and between them at least two concentrically disposed seals.

In accordance with a further feature of the invention, a further improvement in the action of the sealing elements is attained by providing that the metering device is pressed in the direction of the treatment vessel-side openings by an elastic element, preferably a spring, acting between a counterholder secured to the housing of the metering and dispensing device, and the metering device, since by this means the lid secure to the metering device is pressed against the sealing elements.

In accordance with an added feature of the invention, simple manufacture and installation of the apparatus of the invention result by providing that the counterholder is constructed as a bail, having at least one leg that is secured to the housing of the metering and dispensing device.

In accordance with an additional feature of the invention, an equally simple production and installation of the apparatus of the invention is obtained by providing that the counterholder is constructed as a discharge vessel, which is secured to the housing of the metering and dispensing device and extends to the top and bottom beyond the lid, and into which vessel the metered quantity of detergent is fed, wherein the discharge vessel, below the lid, is closed through the use of a screen and above the lid has water inlet openings. With this advantageous feature of the invention, a further gradual delivery of the detergent to the cleaning machine is also attained, because the detergent drops onto a screen and is loosened and carried away from below by the streams of liquid generated in the cleaning machine and from above by the liquid entering through the water inlet openings.

In accordance with again another feature of the invention, a further improvement in function of the apparatus of the invention is attained by providing that the metering device is rotatably supported in the counterholder by the bearing bolt opposite the coupling bolt. A metering device that is supported at two points requires even less driving torque. In accordance with again a further feature of the invention, cleaning and maintenance of the apparatus according to the invention are facilitated by providing a drive that can be disconnected from the coupling bolt and the housing of the metering and dispensing device which engages the coupling bolt.

In accordance with again an added feature of the invention, the cleaning and maintenance of the apparatus according to the invention are facilitated by providing that the apparatus is disconnectably secured in the water-carrying cleaning machine.

With the objects of the invention in view, there is also provided a method for dispensing accurately metered quantities of a powdered detergent into water-carrying cleaning machines, in particular household dishwashers and household washing machines, through the use of an apparatus for repeated, automatic metering of accurately metered quantities of a powdered detergent into water-carrying cleaning machines, in particular household dishwashers and household washing machines, which comprises moving a metering device by a continuous, slow drive in such a way that a metering receptacle moves slowly beneath an outlet opening of a detergent holder, and an accurately metered quantity of detergent can flow gradually by its own weight out of the detergent holder into the metering receptacle; upon continuous slow motion of the metering device, the beginning of a slow uncovering of a discharge opening takes place, leading somewhat in advance of the position of the metering receptacle; upon continuous slow motion of the metering device, a gradual pouring out of the metered quantity of detergent from the metering receptacle into a second chamber takes place; and the accurately metered quantity of detergent transferred to the second chamber is gradually fed through the discharge opening, as a result of a downward-sloping lower surface of the second chamber and of an airflow prevailing in the second chamber, into the interior of a treatment vessel of the water-carrying cleaning machine.

Through the use of the gradual delivery of detergent to the metering device, from the metering device to the second chamber, and from there into the cleaning machine and through the slow motion of the metering device and of the lid, it has become possible, with the method of the invention, for the above-described apparatus of the invention, whose advantages listed above also pertain to the method of the invention, to be realized while preserving these advantages.

Other features which are considered as characteristic for the invention are set forth in the appended claims.

Although the invention is illustrated and described herein as embodied in an apparatus and a method for repeated, automatic metering of precisely metered quantities of a powdered detergent into water-carrying cleaning machines, in particular household dishwashers and household washing machines, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a diagrammatic, front-elevational view of a preferred embodiment of the apparatus of the invention;

FIG. 2 is a longitudinal-sectional view of the apparatus of the invention in accordance with the preferred embodiment, which is taken along a line II—II of FIG. 1, in the direction of the arrows;

FIG. 3 is a longitudinal-sectional view of the apparatus of the invention in accordance with the preferred embodiment, which is taken along a line III—III of FIG. 2, in the direction of the arrows, showing the apparatus of the invention in accordance with the preferred embodiment at the beginning of its loading position;

FIG. 4 is a view similar to FIG. 3 showing the apparatus of the invention in accordance with the preferred embodiment during its loading position;

FIG. 5 is a view similar to FIG. 3 showing the apparatus of the invention in accordance with the preferred embodiment at the beginning of its dispensing position;

FIG. 6 is a view similar to FIG. 3 showing the apparatus of the invention in accordance with the preferred embodiment at the end of its dispensing position;

FIG. 10 is a fragmentary, longitudinal-sectional view of a further embodiment of an apparatus according to the invention;

FIG. 11 is a longitudinal-sectional view of a further embodiment of the apparatus of the invention, which is taken along a line XI—XI of FIG. 10, in the direction of the arrows;

DESCRIPTION OF THE PREFERRED EMBODIMENTS

Figure 7:
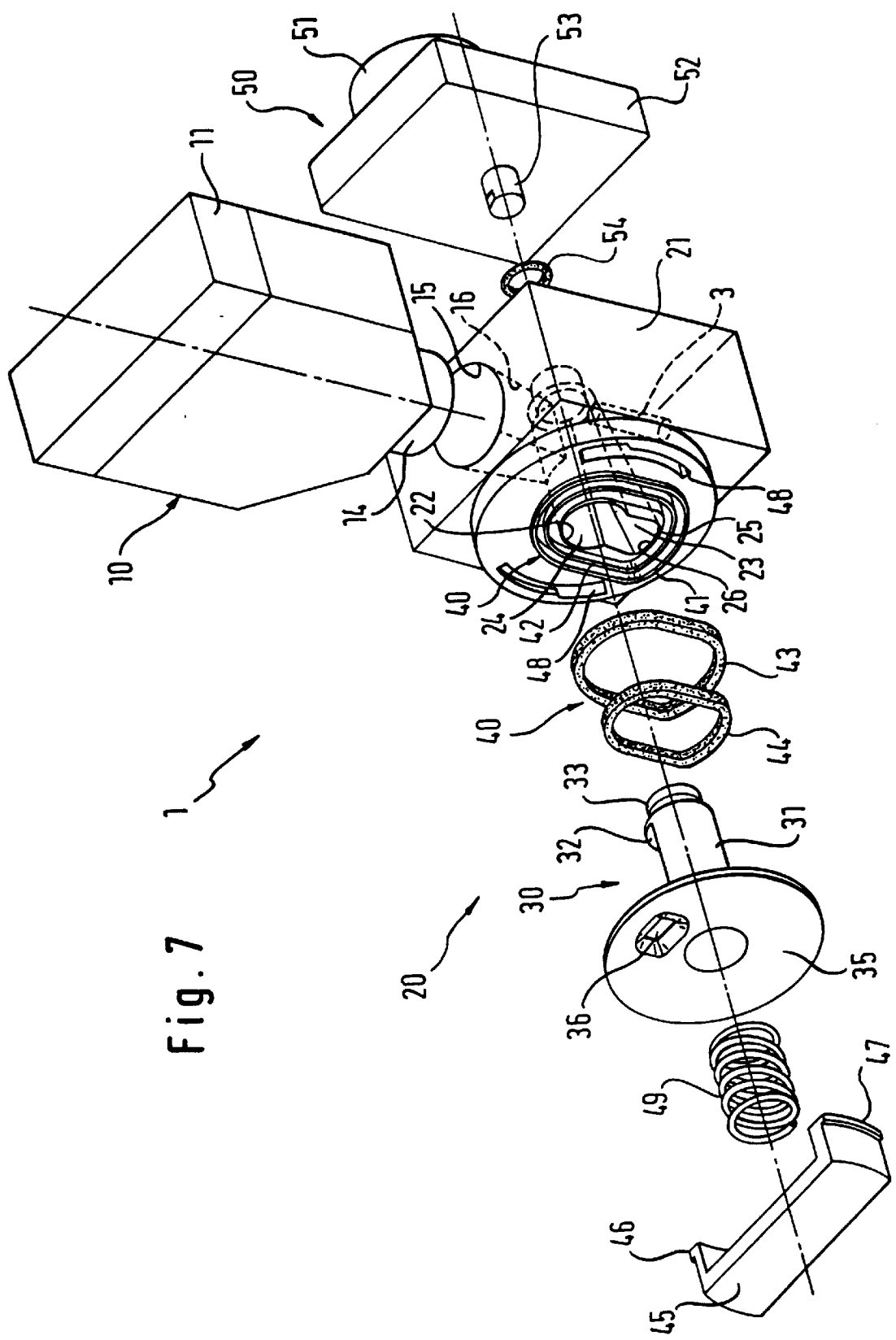
FIG. 7 is an exploded perspective view of the apparatus of the invention in accordance with the preferred embodiment.

Referring now in detail to the figures of the drawing which show a first embodiment in FIGS. 1–9 and a second embodiment in FIGS. 10–17, it is seen that in the drawings, two embodiments of an apparatus 1, 1' according to the invention are illustrated by using the same reference numerals for identical parts. In the exemplary embodiments shown, the apparatus 1, 1' according to the invention is intended for use in a household dishwasher, not described in further detail. The apparatus 1, 1' according to the invention for repeated, automatic metering of precisely metered quantities of a powdered detergent into water-carrying cleaning machines, in particular household dishwashers and household washing machines, substantially includes a detergent holder 10, 10' and a metering and dispensing device 20, 20', with the detergent holder 10, 10' disposed above the metering and dispensing device 20, 20'.

An interior 12, 12' of the detergent holder 10, 10' is closed with a cap 11 in water-tight fashion through the use of sealing elements not described in further detail, and it extends in funnellike fashion in its lower region, terminating in an outlet opening 13, 13'. The apparatus 1, 1' of the invention in accordance with the exemplary embodiments shown passes, as will be described in further detail below, through a loading position (FIGS. 2, 3, 4, 11, 12 and 13), in which the single metered quantity of detergent is transferred from the detergent holder 10, 10' to the metering and dispensing device (20, 20'), and a dispensing position (FIGS. 5, 6, 14 and 15), in which the single metered quantity of detergent is discharged into a treatment vessel 2, 2' of the household dishwasher.

According to the invention, the metering and dispensing device 20, 20' has two chambers communicating with one another, that is, a first chamber 22, 22' and a second chamber 23, 23'; the first chamber 22, 22', communicating with the detergent holder 10, 10', is disposed below the outlet opening 13, 13' of the detergent holder 10, 10', and the second chamber 23, 23' is disposed below the first chamber 22, 22'. In a manner to be described in detail hereinafter, the detergent delivered to the first chamber 22, 22' is delivered gradually into the second chamber 2-3, 23' during the motion of the metering and dispensing device 20, 20'. Both chambers 22, 22', 23, 23' have treatment vessel-side openings 24, 24', 25, 25', and the second chamber 23, 23' has a downward-sloping lower surface 26, 26' in the direction of the treatment vessel-side openings 25, 25'.

The metering and dispensing device 20, 20' has a rotating part 30, 30', which is equipped with a movable metering device 31, 31a, 31', which according to the invention has merely a single metering receptacle 32, 32' for receiving a single metered quantity of powdered detergent. The metering device 31, 31a, 31' is constructed substantially cylindrically and is disposed in the first chamber 22, 22'.

The metering device 31, 31a, 31' is rotatably supported by a coupling bolt 33, 33' in a housing 21, 21' of the metering and dispensing device 20, 20' and is disposed at a distance a, a' from the end, associated with the first chamber 22, 22', of the outlet opening 13, 13' of the detergent holder 10, 10'.

The volume of the second chamber 23, 23' is smaller than the volume of the metering receptacle 32, 32'.

The exemplary embodiments shown, of the apparatus 1, 1' of the invention share the fact that the interior 12, 12' of the detergent holder 10, 10' and a guide of the metering and dispensing device 20, 20' are acted upon continuously by a flow of compressed air; in the dispensing position, the flow of compressed air also acts upon the interior of the metering receptacle 32, 32'. The compressed air is generated in a compressed air generator that is not described in further detail herein and is fed through an air conduit 3, 3' into the metering and dispensing device 20, 20', where it terminates in the second chamber 23, 23'.

Another feature shared by the exemplary embodiments shown of the apparatus 1, 1' of the invention is that the treatment vessel-side openings 24, 24', 25, 25' of the two chambers 22, 22', 23, 23' are closed in the loading position by a lid 35, 35', which is connected to the metering device 31, 31a, 31' and in the dispensing position uncovers a discharge opening 36, 36', from which the metered detergent is gradually delivered to the treatment vessel 2, 2'. The lid, 35, 35' is constructed as a disklike, substantially circular element. As will be described in further detail for the various exemplary embodiments, the lid 35, 35' is acted upon by streams of a cleaning fluid that are generated in the treatment vessel 2, 2'.

In the exemplary embodiments shown of the apparatus 1, 1 of the invention, sealing elements 40, 40a, 40', 40'a that surround the treatment vessel-side openings 24, 24', 25, 25' of both chambers 22, 22', 23, 23' and which cooperate with the lid 35, 35' are disposed on a housing 21, 21' of the metering and dispensing device 20, 20'. These sealing elements 40, 40a, 40', 40'a include at least one sharp-edged sealing edge 41, 41', 42 that protrudes toward the lid 35, 35'. These sealing edges 41, 41', 42 are formed on in the peripheral regions of the treatment vessel-side openings 24, 24', 25, 25' of the two chambers 22, 22', 23, 23' onto the housing 21, 21' of the metering and dispensing device 20, 20'.

The metering device 31, 31a, 31' is pressed in the direction of the treatment vessel-side openings 24, 24', 25, 25' by an elastic element 49, 49', preferably a spring, acting between a counterholder 45, 45', 45" secured to the housing 21, 21' of the metering and dispensing device 20, 20', and the metering device 31, 31a, 31'.

The apparatus 1, 1' is driven by a drive 50, 50', which engages the coupling bolt 33, 33' and can be disconnected from the coupling bolt 33, 33' and from the housing 21, 21' of the metering and dispensing device 20, 20'.

The entire apparatus 1, 1' of the invention is, as explained for each of the various embodiments, disconnectably secured in the household dishwasher.

Explanation of the function, which is the same for both exemplary embodiments shown, of the apparatus 1, 1' according to the invention, or in other words of the method of the invention for operating the apparatus 1, 1' of the invention:

The metering and dispensing operation can be set into motion in the household dishwasher by a program control, not described in further detail, at predetermined times of the dishwashing program. Then the metering device 31, 31a, 31' is moved through the use of the continuous, slow drive 50, 50', in such a way that the metering receptacle 32, 32' rotates slowly below the outlet opening of the detergent holder 10, 10' (see FIGS. 2, 3, 4, 11, 12 and 13). An accurately metered quantity of detergent can then flow gradually out of the detergent holder 10, 10' into the metering receptacle 32, 32' by its own weight. During continuous slow motion of the metering device 31, 31a, 31', leading somewhat in advance of the position of the metering receptacle 32, 32', the beginning of a slow uncovering of the discharge opening 36, 36' then ensues (see FIGS. 5 and 14). Now, because of the continuous slow motion of the metering device 31, 31a, 31', a gradual pulling out of the metered quantity of detergent takes place from the metering receptacle 32, 32' into the second chamber 23, 23' (see FIGS. 5, 6, 14 and 15); at the same time, the accurately metered quantity of detergent transferred to the second chamber 23, 23' is gradually fed into the interior of the treatment vessel 2, 2' of the household dishwasher through the discharge opening 36, 36', as a result of the down-sloping lower edge of the second chamber 23, 23' and the air flow prevailing in the second chamber 23, 23'. Due to the slow, continuous drive of the metering device 31, 31a, 31', the discharge opening 36, 36' remains open for a rather long time, so that already quite soon after the uncovering of the discharge opening 36, 36', and empirically after about half the length of the entire time period within which the discharge opening 36, 36' is in communication with the second chamber 23, 23', the entire metered quantity of detergent is expelled so that it is possible to assure that through the use of the air flow even the slightest residues of detergent will be blown out of the second chamber 23, 23'. After the closure of the treatment vessel-side opening 25, 25' of the second chamber 23, 23', the metering device 31, 31a, 31' is put by the drive 50, 50' into a position of repose, which is located just before the loading position of the apparatus 1, 1' of the invention, and the metering and dispensing operation with the apparatus 1, 1' of the invention is at an end. It is naturally possible at any time, for example on a request for dispensing a plurality of accurately metered quantities of detergent, to cause the above-described operation to proceed multiple times in a single cleaning cycle.

As is known per se, to perform the method of the invention it is assumed that at least during the dispensing of the accurately metered quantity of detergent into the treatment vessel 2, 2' of the water-carrying cleaning machine, the devices in the machine for producing streams of a cleaning fluid, and/or for recirculating a cleaning fluid, in the treatment vessel 2, 2', for example in the spray arms present in the household dishwasher, are not operated or are not supplied with cleaning fluid.

The special features of the preferred embodiment of the invention (FIGS. 1–9) will now be described.

The drive 50 of the metering and dispensing device 20 of the preferred embodiment of the invention is constructed as an actuator 51 with a gear 52. It is disposed in the non-illustrated door of the household dishwasher and protrudes through an inner door 7, with the interposition of a suitable seal 54, by a transfer shaft 53 into the coupling bolt 33 of the metering device 31. The detergent holder 10 is disconnectably mounted on the housing 21 of the metering and dispensing device 20 through the use of a collar 14, which is inserted into a receiving bore 15 in the housing 21. The transition from the receiving bore 15 to the first chamber 22 of the metering and dispensing device 20 is formed by a frustoconical conduit 16. The above-described fastening configuration makes it clear that the apparatus 1 of the invention in the preferred embodiment can be removed entirely, except for the drive 50, in a simple way from the household dishwasher and removed for maintenance purposes, or can be disconnected from the -metering and dispensing device 20 for filling of the detergent holder 10 and then removed from the household dishwasher. The fastening of the removable apparatus 1 according to the invention in the preferred embodiment can be constructed in detail as described in Italian Patent Application 67125-A/90. The drive 50 may alternatively be constructed as an electric motor with a gear, for instance.

The non-illustrated compressed air generator is also disposed in the door of the household dishwasher, in order to save space.

Figure 8:
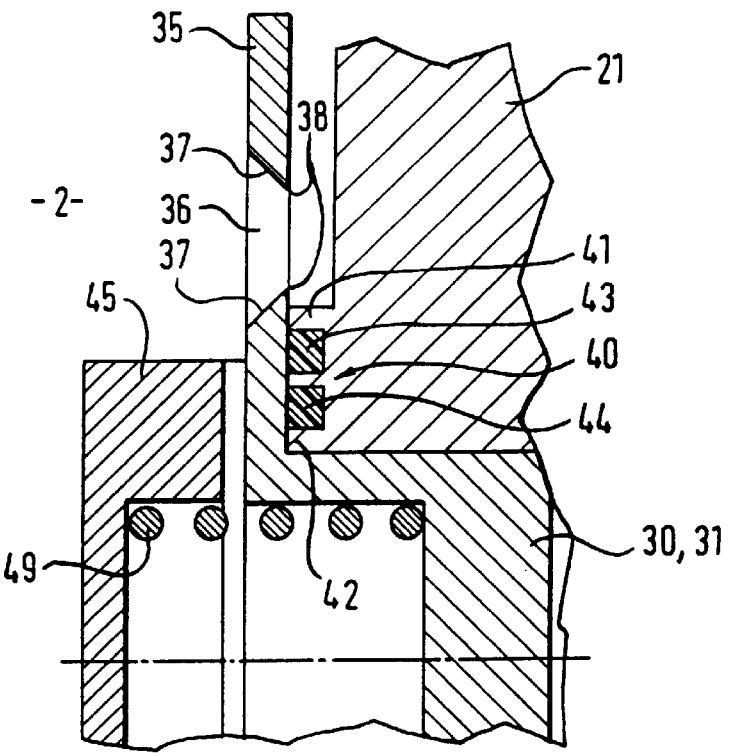
FIG. 8 is a fragmentary, enlarged view of a portion VIII of FIG. 2.

In the preferred embodiment of the invention, the lid 35 is formed onto the metering device 31, in which the discharge opening 36 is disposed in the form of an aperture, having side walls 37 which, in the exemplary embodiment shown, are beveled and constructed with a sharp-edged profile 38 (see FIG. 8). A lower edge 39 of the discharge opening 36 is located somewhat lower, in the dispensing position of the metering and dispensing device 20, than a lowermost edge 29 of the treatment vessel-side opening 25 of the second chamber 23 (see FIG. 5). As can clearly be seen in FIG. 8, the lid 35 with the discharge opening 36, in the position of repose, protrudes beyond the housing 21 of the metering and dispensing device 20 and is in the open. The lid 35, on both its inner and outer surface, and the discharge opening 36 can therefore be acted upon and thus cleaned by the streams of a cleaning fluid generated in the treatment vessel 2, so that self-cleaning of the apparatus 1 according to the invention in the preferred embodiment is attained.

The discharge opening may also be constructed frusto-conically.

In order to carry out the transfer of the quantity of detergent placed in the metering receptacle 32 by the above-described method of the invention, the discharge opening 36 is disposed, leading ahead of the metering receptacle 32 in the direction of motion of the metering device 31, in such a way that in the motion toward the dispensing position of the metering and dispensing device 20, the discharge opening 36 reaches the treatment vessel-side opening 25 of the second chamber 23 even before the beginning of the gradual delivery of detergent from the metering receptacle 32 to the second chamber 23, or in other words before the metering device 31 has rotated in such a way that detergent can trickle out of the metering receptacle 32 into the second chamber 23.

In the apparatus 1 of the invention in accordance with the preferred embodiment of the invention, the sealing elements 40 include two sealing edges 41, 42, disposed concentrically around the treatment vessel-side openings 24, 25 of the two chambers 22, 23, and two concentrically disposed seals 43, 44 between these sealing edges, as can best be seen from FIG. 8. The sealing edges 41, 42 of the apparatus according to the invention in the preferred embodiment are constructed as lamination-like scrapers. The inner sealing edge 42 provides sealing against the detergent from the second chamber 23 and thus also protects the inner seal 44 against scouring residues of detergent particles. The outer sealing edge 41 provides sealing against dust entering from outside and thus protects the outer seal 43 against scouring residues. The seals 43, 44 form a dual protection against the entry of moisture into the apparatus 1 according to the invention.

Figure 9:
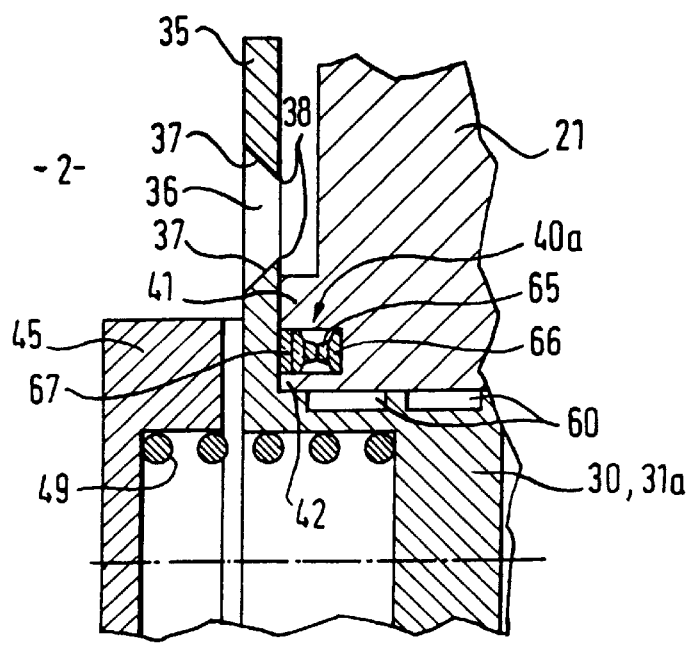
FIG. 9 is a view similar to FIG. 8, in accordance with a particular feature of a metering device and sealing elements of the preferred embodiment of the apparatus according to the invention.
Figure 12:
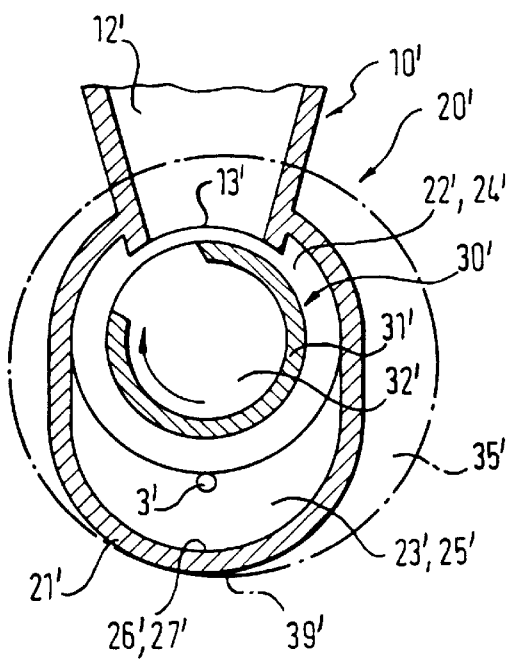
FIG. 12 is a longitudinal-sectional view showing a location of a lid at the beginning of the loading position of the apparatus of the invention in accordance with the further embodiment.
Figure 13:
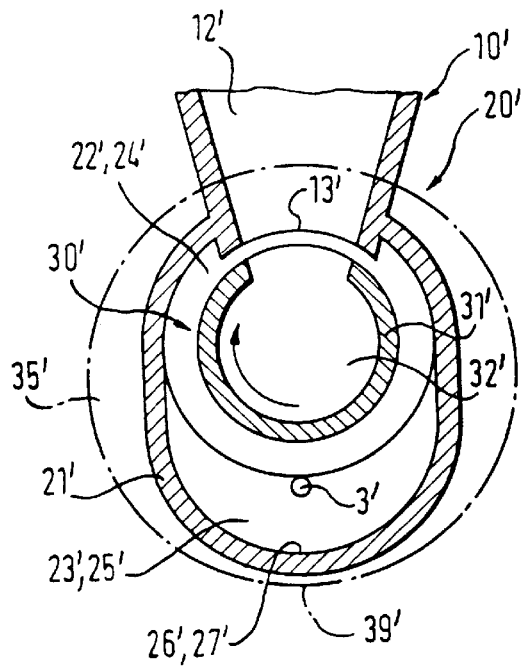
FIG. 13 is a view similar to FIG. 12 showing the location of the lid in the loading position of the apparatus of the invention in accordance with the further embodiment.

The counterholder 45 is constructed as a bail, having two legs 46, 47 which are secured in the manner of a bayonet mount in receiving slits 48 on the housing 21 of the metering and dispensing device 20. The installed position of the bail 43 is indicated by dot-dashed lines in FIG. 2. FIG. 9 shows a special feature of the metering device 31a of the apparatus 1 of the invention in the preferred embodiment; the metering device 31a is equipped, at the points that come into contact with the housing 21, with channels 60 which on one hand reduce the friction between the housing 21 and the metering device 31a and on the other hand carry detergent particles that invade the second chamber 23 onto the down- sloping lower surface 26.

FIG. 9 also shows a particular embodiment of sealing elements 40a of the apparatus 1 of the invention in the preferred embodiment; a seal 65 has an inner part 66 and an outer part 67, and the inner part 66 has greater elasticity than the outer part 67. The seal 65 is essentially in the form of a double trapezoid. Due to this shape and because of the more-elastic inner part 66, the seal 65 can act as a spring and can compensate for possible abrasion of the outer part 67, which rests on the inner surface of the lid 35, or for major deformation. The friction between the lid 35 and the seal 65 is thus reduced.

The method of the invention for dispensing accurately metered quantities of a powdered detergent into the household dishwasher through the use of the apparatus 1 according to the invention in the preferred embodiment of the invention will now be described in conjunction with FIGS. 3–6.

FIG. 3 shows how the metering device 31 is moved, through the use of the continuous, slow drive 50, that the metering receptacle 32 moves slowly to beneath the outlet opening 13 of the detergent holder 10, and the gradual transfer of detergent from the detergent holder 10 to the metering receptacle 32 has already begun.

In FIG. 4, the entire metering receptacle has now reached the location below the outlet opening 13 of the detergent holder 10, and an accurately metered quantity of detergent can flow by its own weight out of the detergent holder 10 gradually into the metering receptacle 32.

In FIG. 5, with continuous slow motion of the metering device 31 leading somewhat ahead of the position of the metering receptacle 32, the discharge opening 36, which is shown in solid lines in FIGS. 3–6 for better visibility, has reached the treatment vessel-side opening 25 of the second chamber 23, and the gradual pouring out of the metered quantity of detergent from the metering receptacle 32 into the second chamber 23 has begun; the accurately metered quantity of detergent transferred to the second chamber 23 is gradually delivered through the discharge opening 36 into the interior of the treatment vessel 2 of the household dishwasher, because of the down-sloping lower surface 26 of the second chamber 23 and the air flow prevailing in the second chamber 23. Due to the disposition somewhat in advance of the metering receptacle 32 and because of the slow continuous drive of the metering device 31, the discharge opening 36 remains open rather long, so that already quite soon after the uncovering of the discharge opening 36, and empirically after about half the length of the entire period of time during which the discharge opening 36 is in communication with the second chamber 23, the entire metered quantity of detergent is expelled, so that it can be assured that through the use of the air flow even the most minimal residues of detergent can be blown out of the second chamber 23.

In FIG. 6, the dispensing operation to the household dishwasher is concluded, and the discharge opening 36 has already almost left the treatment vessel-side opening 25 of the second chamber 23 behind. The metering device 31 is rotated by the continuous slow drive 50 into a position of repose just before the loading position of FIG. 3, and thus the treatment vessel-side opening 25 of the second chamber 23 is closed again, and a new metering and dispensing operation can begin, for instance controlled by a program control of the household dishwasher that is not described in further detail herein. It is naturally possible at any time, for instance on a request for the dispensing of a plurality of accurately metered quantities of detergent, to cause the above-described operation to be performed multiple times within one cleaning cycle.

The special features of the further embodiment of the invention (FIGS. 10–17) will now be described.

In contrast to the above-described configuration of the apparatus 1 of the invention in the preferred embodiment in the household dishwasher, the apparatus 1' of the invention in accordance with the further embodiment is disposed substantially in a non-illustrated door of the household dish-washer and is secured, through the use of a threaded ring 4', which is screwed to a threaded collar 5' of the housing 21' of the metering and dispensing device 20', to an aperture of an inner door 7' with the interposition of a suitable seal 6', in such a way that essentially only the treatment vessel-side opening 24', 25', the lid 35', and the counterholder 45', 45" protrude into the treatment chamber 2' of the household dishwasher.

In addition to the bearing in accordance with the above-described preferred embodiment of the invention, in the further embodiment of the invention the metering device 31' is rotatably supported in the counterholder 45', 45" by a bearing bolt 34' opposite the coupling bolt 33'.

As shown in FIG. 10, the counterholder 45' is constructed as a bail on one side, having a leg 46' which is secured to the housing 21' of the metering and dispensing device 20' in the manner of a bayonet mount.

The lid 35' is permanently connected to the bearing bolt 34' of the metering device 31' and is eccentrically disposed in such a way that upon the motion of the metering device 31' toward the dispensing position of the metering and dispensing device 20', the uncovering of the discharge opening 36', or in other words the uncovering of the treatment vessel-side opening 25' of the second chamber 23', begins even before the beginning of the gradual delivery of detergent from the metering receptacle 32', since as a result of the eccentric disposition of the circular lid 35', a lower edge 39' of the lid 35' lifts up over the lowermost edge 2-7' of the treatment vessel-side opening 25' of the second chamber 23'. Since the bail-shaped counterholder 45' only slightly covers the lid 35', the lid 35' can be acted upon and therefore cleaned by the streams of a cleaning fluid generated in the treatment vessel 2', so that self-cleaning of the apparatus 1' according to the invention in the further embodiment is attained.

As an alternative to the drive 50 through the use of an actuator 51 and gear 52 used in the first-described preferred embodiment of the invention above, the drive 50' of the metering and dispensing device 20' of the further embodiment of the-invention is formed by a non-illustrated electric motor with a gear of which only a gear wheel 52' is shown, which protrudes with a transmission part 53' into the housing 21' of the metering and dispensing device 20' with the interposition of a suitable seal 54' and is disconnectably connected to the coupling bolt 33' of the metering device 31'.

Figure 17:
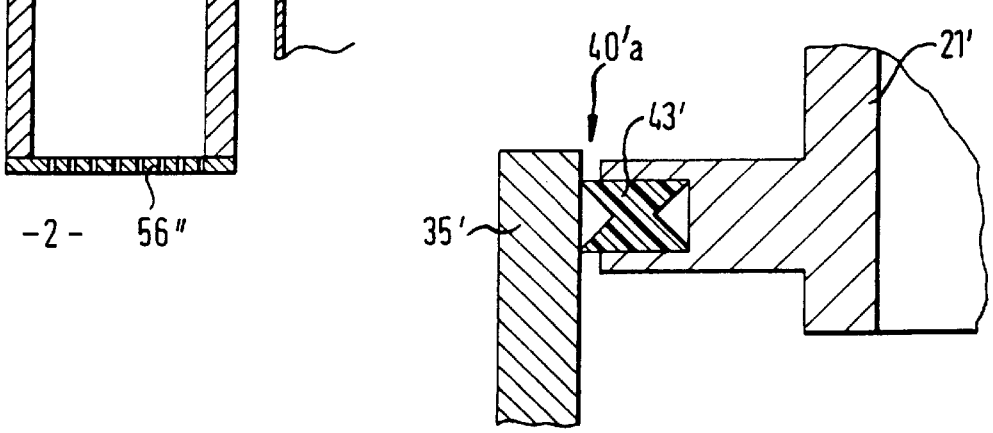
FIG. 17 is an enlarged fragmentary view of a portion XVII of FIG. 10, with a particular embodiment of sealing elements of the apparatus of the invention in accordance with the preferred embodiment.

In FIG. 17, a particular embodiment of sealing elements 40'a of the apparatus 1' of the invention in the further embodiment is shown; the alternative use of a seal 43', a so-called quad ring, is shown in addition to the sealing edge 41' or as a substitute for the sealing edge 41'.

Figure 16:
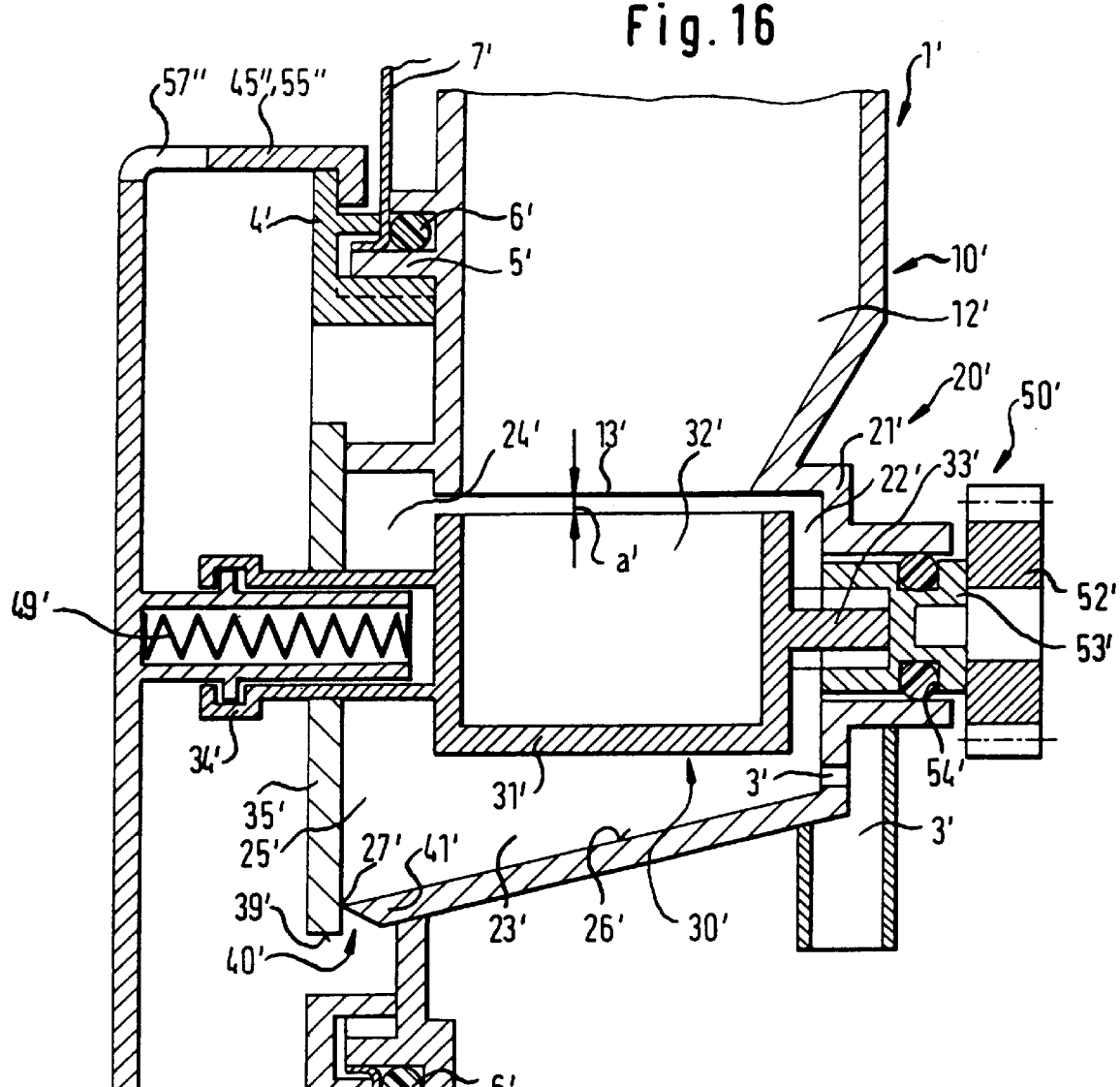
FIG. 16 is a fragmentary, longitudinal-sectional view of the apparatus of the invention in accordance with the preferred embodiment having a particular feature of a counter-holder.

In FIG. 16, a particular embodiment of the counterholder 45" in accordance with the further embodiment of the invention is shown; the counterholder 45" is constructed as a discharge container 55", which is secured to the housing 21 of the metering and dispensing device 20' and extends outward beyond the lid 35' at the top and bottom. The metered quantity of detergent is delivered to the discharge container 55", and the discharge container 55" is closed through the use of a screen 56" below the lid 35' and has water inlet openings 57" above the lid 35'. The detergent expelled by the metering and dispensing device 20' into the discharge container 55" drops onto the screen 56" and is detached and carried away from below by the streams of liquid generated in the cleaning machine and from above by the liquid entering through the water inlet openings 57". The liquid entering through the water inlet openings 57" is naturally also embodied by streams of a cleaning fluid generated in the treatment vessel 2'. Since this cleaning fluid in the discharge container 55" can also reach the lid 35 unhindered, the lid 35 is acted upon by the cleaning fluid and cleaned, so that in this particular feature of the counterholder 45" of the apparatus 1' of the invention in accordance with the further embodiment as well, a self-cleaning effect is attained.

The method of the invention for dispensing accurately metered quantities of a powdered detergent into the household dishwasher through the use of the apparatus 1' of the invention in accordance with the further embodiment of the invention is described in conjunction with FIGS. 12, 13, 14 and 15, which show it schematically. For better illustration, the housing 21' of the metering and dispensing device 20', the detergent holder 10', and the metering device 31' are shown shaded in FIGS. 12, 13, 14 and 15. The lid 35' is shown as a solid line.

The metering device 31' is moved through the use of the continuous, slow drive 50', in such a way that the metering receptacle 32' rotates slowly to underneath the outlet opening 13' of the detergent holder 10' (see FIG. 12), and an accurately metered quantity of detergent can flow gradually by its own weight out of the detergent holder 10' into the metering receptacle 32'. The lid 35 covers the treatment vessel-side openings 24', 25' of the two chambers 22', 23'. In the position shown in FIG. 13, the metering receptacle 32' has fully reached the position directly below the outlet opening 13'. There, the lid 35' still covers the treatment vessel-side openings 24', 25' of the two chambers 22', 23'.

Figure 14:
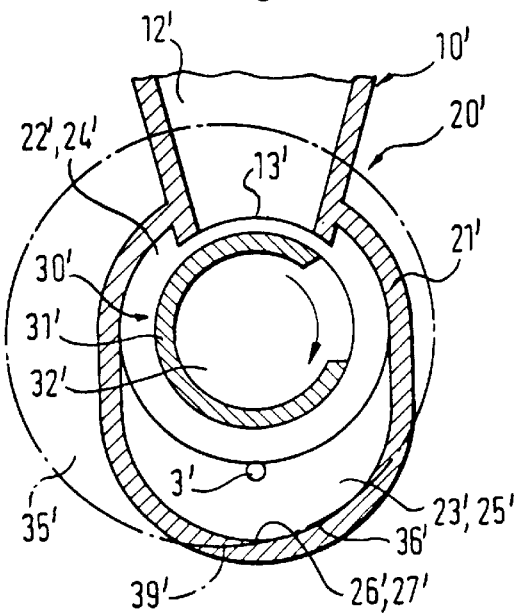
FIG. 14 is a view similar to FIG. 12 showing the location of the lid at the beginning of the dispensing position of the apparatus of the invention in accordance with the further embodiment.
Figure 15:
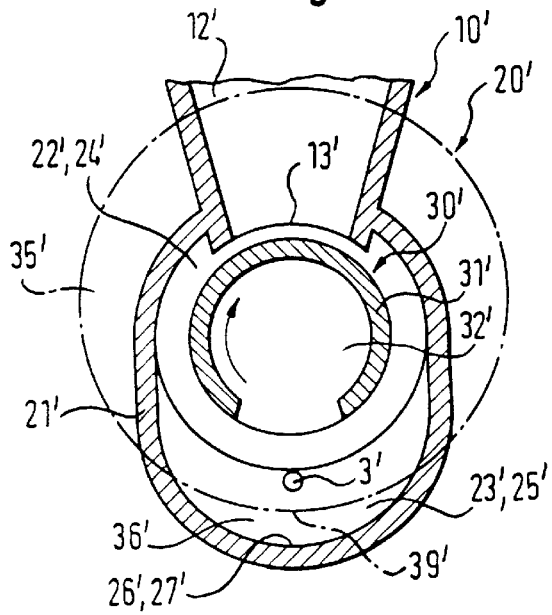
FIG. 15 is a view similar to FIG. 12 showing the location of a lid in the dispensing position of the apparatus of the invention in accordance with the preferred embodiment.

During continuous slow motion of the metering device 31', somewhat in advance of the position of the metering receptacle 32', the beginning of a slow uncovering of the discharge opening 36' now ensues, since the lower edge 39' of the lid 35' lifts up over the lowermost edge 27' of the treatment vessel-side opening 25' of the second chamber 23'. This is the beginning of the uncovering of the discharge opening 36', as shown in FIG. 14; the transfer of the metered quantity of detergent from the metering receptacle 32' to the second chamber 23' has not yet begun, because of the disposition of the lid 35' leading ahead of the position of the metering receptacle 32'. During continuous slow motion of the metering device 31', a gradual pouring out of the metered quantity of detergent from the metering receptacle 32' into the second chamber 23' now ensues, and at the same time, the quantity of detergent gradually transferred to the second chamber 23' is gradually fed through the discharge opening 36' into the interior of the treatment vessel 2' of the household dishwasher (see FIG. 10) or into the discharge container 55" and from there into the treatment vessel 2' of the household dishwasher (see FIG. 16), because of the down-sloping lower surface 26' of the second chamber 23' and because of the air flow prevailing in the second chamber 23'. In FIG. 15, the discharge opening 36' is schematically shown; it is formed by the lifted-up edge 39' of the lid 35' and by the exposed lowermost edge 27' of the treatment vessel-side opening 25' of the second chamber 23'. In this further variant of the invention as well, because of the slow continuous drive of the metering device 31', the discharge opening 36' remains open rather long, so that already quite early after the uncovering of the discharge opening 36', empirically after about half the length of the entire period of time within which the discharge opening 36' is in communication with the second chamber 23', the entire metered quantity of detergent is expelled, so that it can be assured that because of the air flow even the least residues of detergent are blown out of the second chamber 23'. Thus in the position of FIG. 15, in the apparatus 1' according to the further embodiment, the entire quantity of detergent has already been expelled.

After the conclusion of the operation of dispensing to the household dishwasher, the discharge opening 36' and with it the treatment vessel-side opening 25' of the second chamber 23' are closed again, as a consequence of the continuous slow movement of the metering device 31' and therefore of the lid 35'. The metering device 31' is rotated back into a position of repose prior to the beginning of the loading position of FIG. 12 by the continuous slow drive 50', and a new metering and dispensing operation can begin, for instance controlled by a program control, not described in further detail, of the household dishwasher. It is naturally possible at any time, for example on a request—for the dispensing of a plurality of accurately metered quantities of detergent, to cause the above-described operation to proceed multiple times within one cleaning cycle.

We claim:

1. A method for dispensing accurately metered quantities of a powdered detergent into water-carrying cleaning machines, in particular household dishwashers and household washing machines, with an apparatus for repeated, automatic metering of accurately metered quantities of a powdered detergent into water-carrying cleaning machines, in particular household dishwashers and household washing machines, which comprises:

moving a metering device with a continuous, slow drive for moving a metering receptacle slowly beneath an outlet opening of a detergent holder, and permitting an accurately metered quantity of detergent to flow gradually by its own weight out of the detergent holder into the metering receptacle;

continuously slowly moving the metering device for beginning a slow uncovering of a discharge opening, leading somewhat in advance of the position of the metering receptacle; continuously slowly moving the metering device for gradually pouring out the metered quantity of detergent from the metering receptacle into a chamber; and gradually feeding the accurately metered quantity of detergent transferred to the chamber through the discharge opening, as a result of a downward-sloping lower surface of the chamber and of an airflow prevailing in the chamber, into the interior of a treatment vessel of the water-carrying cleaning machine.

* * * * *

UNITED STATES PATENT AND TRADEMARK OFFICE
CERTIFICATE OF CORRECTION

PATENT NO : 5,829,085
DATED : November 3, 1998
INVENTOR(S): Helmut Jerg et al.

It is certified that error appears in the above-identified patent and that said Letters Patent is hereby corrected as shown below:

On the title page, item [54] and col. 1, the title should read--

APPARATUS AND METHOD FOR REPEATED, AUTOMATIC METERING OF PRECISELY METERED QUANTITES OF A POWDERED DETERGENT INTO WATER-CARRYING CLEANING MACHINES, IN PARTICULAR HOUSEHOLD DISHWASHERS AND HOUSEHOLD WASHING MACHINES--.

Signed and Sealed this

Nineteenth Day of September, 2000

Attest:

Q. TODD DICKINSON

*Attesting Officer*  *Director of Patents and Trademarks*